G. AASETH.
MACHINE FOR CULTIVATING UNBROKEN GROUND.
APPLICATION FILED MAR. 13, 1919.
1,353,012. Patented Sept. 14, 1920.
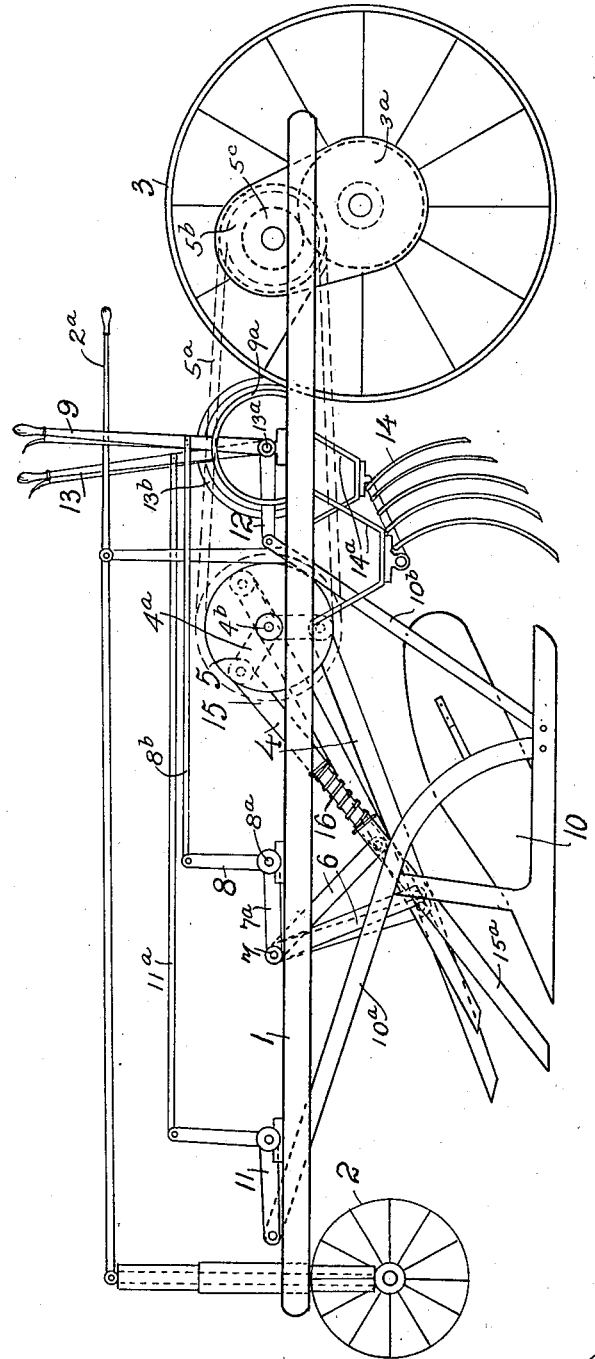
Inventor
Gustav Aaseth
by Laurence Langner
Att'y.

UNITED STATES PATENT OFFICE.

GUSTAV AASETH, OF CHRISTIANIA, NORWAY.

MACHINE FOR CULTIVATING UNBROKEN GROUND.

1,353,012.     Specification of Letters Patent.     Patented Sept. 14, 1920.

Application filed March 13, 1919. Serial No. 282,455.

*To all whom it may concern:*

Be it known that I, GUSTAV AASETH, of Wahlsgate 5, Christiania, in the Kingdom of Norway, have invented certain new and useful Improvements in Machines for Cultivating Unbroken Ground; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object the provision of an improved agricultural machine which is particularly well adapted for breaking new ground.

A feature of the present invention is the provision on a suitable frame of digging or spading elements, a plow share located to the rear of the digging elements and a harrow or rake disposed to the rear of the plow share all of which coöperate to more efficiently prepare new ground.

According to the present invention the digging elements are reciprocated or given a digging movement by suitable mechanism operated by the ground wheels during the advance of the machine. These digging elements are connected to means whereby they may be adjusted or moved relatively to the ground surface so as to be entirely ineffective on the ground or effective at different depths with respect to the surface of the ground, a suitable lever being provided for the purpose of this adjustment. The plow share by means of a suitable lever may likewise be adjusted so as to be entirely ineffective or to be effective at different depths. The harrow or rake is arranged obliquely with respect to the frame of the machine so as to push loose stones, roots etc. to the side.

The drawings illustrate one embodiment of this invention.

The ground working parts of the present invention are carried on a frame 1 having front ground wheels 2 and rear ground wheels 3 whereby the frame is supported. The front ground wheels are preferably moved by a lever $2^a$ for the purpose of steering the machine. The digging or spading rods 4 are pivotally mounted on crank arms $4^a$ secured to a shaft $4^b$ which is provided with a suitable sprocket 5. The sprocket 5 is connected by a chain $5^a$ to a sprocket $5^b$ which by means of a gearing $5^c$ is driven by a gear $3^a$ connected to the rear wheel 3. Thus when the rear wheel 3 is rotated during the advance of the machine the sprocket 5 is rotated and consequently the shaft $4^b$ with its crank arms $4^a$ angularly disposed relatively to one another cause the digging arms 4 to reciprocate toward and from the ground one after the other. The forward end of each digging rod 4 is guided and supported by a link 6 pivoted at 7 to an arm $7^a$. Each of the arms $7^a$ are secured to a shaft $8^a$ having an arm 8 connected by a link $8^b$ to a controlling lever 9. The links 6 cause the digging rods 4 at their digging end to enter the ground then move upwardly and forwardly and then to be drawn back preparatory to the next digging operation. When it is desired to adjust the digging depth of the digging rods 4 the shaft $8^a$ is rocked by movement of the lever 9 to raise all the links 6 and consequently all the digging rods relative to the ground surface. The controlling lever 9 is held in adjusted position by a suitable segmental rack or quadrant diagrammatically illustrated at $9^a$.

The plow share 10 which is located directly to the rear of the digging bars 4 is connected to the frame by means of links $10^a$ and $10^b$ the link $10^a$ being pivoted to a bell crank 11 and the link $10^b$ being connected to an arm 12. The bell crank 11 is connected by a link $11^a$ to a controlling lever 13 secured to a shaft $13^a$ to which the arm 12 is also secured. The movement of the controlling lever 13 by the operator causes the bell-crank 11 and arm 12 to be moved, thereby raising and lowering the plow share 10 to control the depth of the cut thereof. The controlling lever 13 is held in adjusted position by a suitable segmental rack or quadrant illustrated diagrammatically at $13^b$.

The harrow 14 is disposed immediately to the rear of the plow share 10 and is secured to the frame in an oblique position by brackets $14^a$. The harrow in this position will push to the side stones and roots, etc., dislodged by the digging elements and the plow share.

In order to prevent the digging rods from being severely damaged by striking directly against a heavy solid object such as large stones the rods are each divided into two parts; a part 15 is connected to the crank arm $4^a$ while the part $15^a$ is telescopically mounted therein. The two parts 15 and $15^a$ are held in their normal positions relative to one another by means of a spring 16 which will yield upon the engagement of the part 15$^b$ with a heavy solid object that it can not break or dislodge.

I claim as my invention:

1. In an agricultural machine for breaking new ground the combination of a frame; a plurality of digging rods carried by said frame; crank arms operating said digging rods whereby said digging rods are given a digging movement; means operated by the forward travel of the machine for operating said crank arms; links for supporting the forward end of the digging rods; a frame for carrying said links; means for adjusting said frame to vary the digging operation of the digging rods; means located to the rear of said digging rods for turning the turf after the ground has been dug; and means mounted on said frame to the rear of said turf turning means obliquely to the longitudinal axis of the frame for pulverizing the soil prepared by the digging rods and the last named means.

2. In an agricultural machine for breaking new ground the combination of a frame; a plurality of digging rods carried by said frame; crank arms operating said digging rods whereby said digging rods are given a digging movement; means operated by the forward travel of the machine for operating said crank arms; links for supporting the forward end of the digging rods; a frame for carrying said links; means for adjusting said frame to vary the digging operation of the digging rods; vertically adjustable means located to the rear of said digging rods for turning the turf after the ground has been dug; and a harrow mounted on said frame to the rear of said turf turning means obliquely to the longitudinal axis of the frame for pulverizing the soil prepared by the digging rods and the last named means.

In testimony that I claim the foregoing as my invention, I have signed my name in presence of two subscribing witnesses.

GUSTAV AASETH.

Witnesses:
MAGARS BUGGE,
MARGET AANENSEN.